July 31, 1951 — M. J. KUNERT ET AL — 2,562,672
COMBINATION PRESSURE RELIEF AND SAFETY HEAD VALVE
Filed Dec. 11, 1946
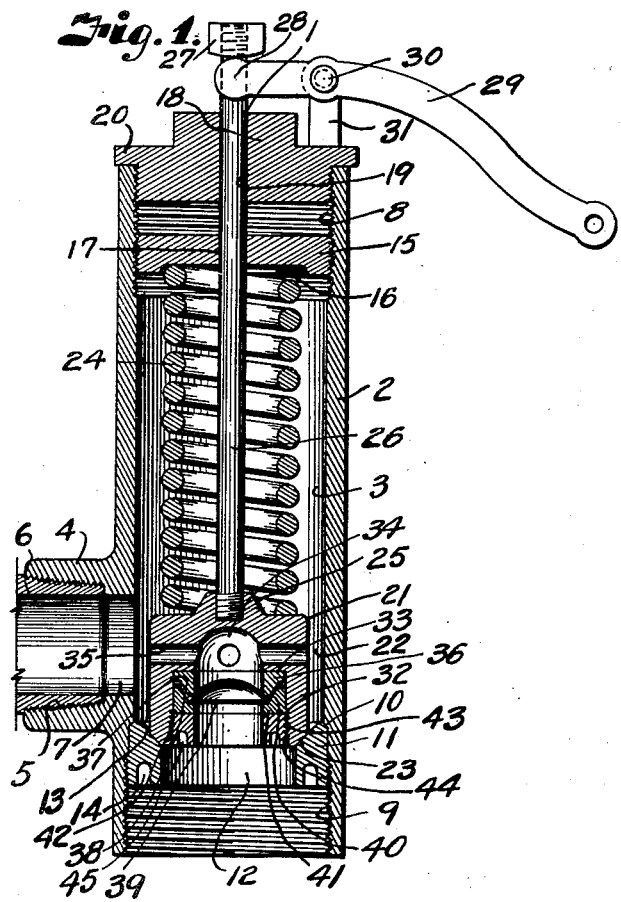
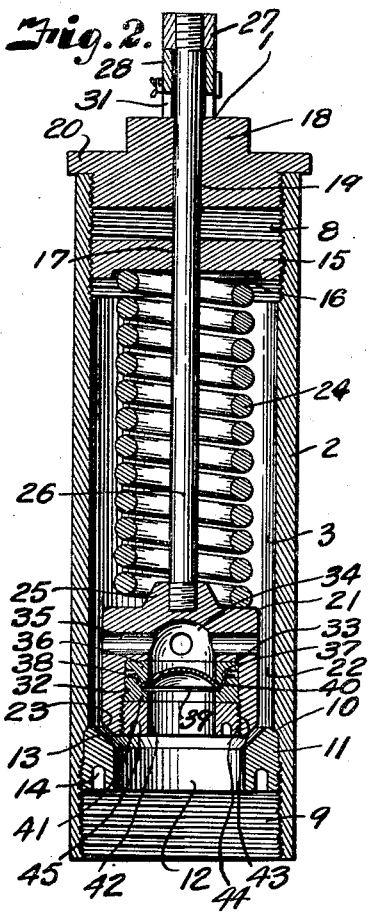
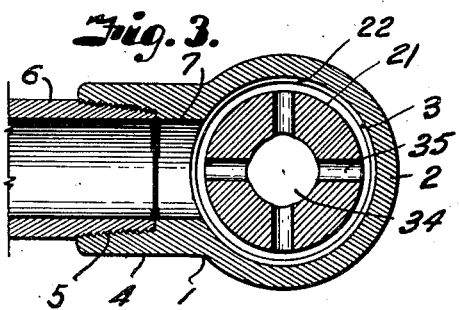
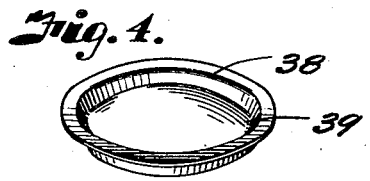
Inventors
Max J. Kunert
Robert S. Coffman
By Fishburn & Mullendore
Attorneys Patented July 31, 1951

2,562,672

UNITED STATES PATENT OFFICE 2,562,672

COMBINATION PRESSURE RELIEF AND SAFETY HEAD VALVE

Max J. Kunert and Robert S. Coffman, Kansas City, Mo., assignors to Black, Sivalls & Bryson, Inc., Kansas City, Mo., a corporation of Delaware Application December 11, 1946, Serial No. 715,490

1 Claim. (Cl. 137—53)

This invention relates to a combination pressure relief and safety head valve for relieving pressure from a vessel or the like by regular relief valve action under normal working conditions and by way of the safety head under an abnormal condition and when the relief valve fails to function.

The principal object of the invention is to provide a combination relief and safety head valve wherein the safety head is incorporated into the structure of the valving element of the device.

Other objects of the invention are to provide an extremely simple and reliable construction, and to provide a valving member which accommodates the safety head and which gives adequate relief of pressure directly therethrough.

In accomplishing these and other objects of the invention, we have provided improved structure, the preferred form of which is illustrated in the accompanying drawing wherein:

Fig. 1 is a vertical section through a combination relief and safety head valve embodying the features of the present invention and showing the valving member in seated position.

Fig. 2 is a vertical section taken at right angles to the section illustrated in Fig. 1 and showing the valving member in unseated position.

Fig. 3 is a horizontal section through the device.

Fig. 4 is a perspective view of the safety head or safety diaphragm employed in the valving element of the relief valve.

Referring more in detail to the drawing.

I designates a pressure device which includes a body 2 having an axial bore 3 therethrough and which is provided with a laterally extending collar 4 that may be internally threaded as at 5 or otherwise formed to connect a duct 6. The collar is provided with a port 7 in connection with the bore 3. The bore 3 is internally threaded at the respective ends thereof as indicated at 8 and 9. Turned into the threads 9 and seated against an annular stop shoulder 10 of the valve body is a valve seat ring 11 having an axial port 12 encircled by a bevel seat 13 which in the illustrated instance is on the side of the ring in the direction of the port 7 whereby the opening 12 may constitute an inlet port and the opening 7 an outlet port.

The ring 11 is provided with spanner wrench engaging recesses 14 so that it may be turned into the threaded end of the valve body by a suitable spanner wrench (not shown). The threads 9 may be of sufficient depth so that they also provide for connection of the valve body with a pressure vessel or other device from which pressure is to be relieved. Turned into the threads at the opposite end of the valve body is an externally threaded disk 15 having a spring seat 16 on the side facing the valve seat and which is provided with an axial opening 17 for passing a valve stem later described. Also engaged with the threads 8 and closing that end of the bore of the valve body is a cap 18 which has an opening 19 registering with the opening 17. The cap 18 has an annular flange 20 which abuts against the valve body, however, it may be of any suitable shape.

Located within the valve body and movable to and from the seat is a valving member 21 of substantially cylindrical shape and is of a size to provide an annular passageway 22 therearound. The valving member extends across the opening 12 and has a beveled marginal edge 23 which engages the seat 13. The valving member is normally retained seated under action of a coil spring 24 having one end bearing against the valving member 21 and its opposite end bearing in the seat 16. The valving member has a boss 25 encircled by the seating end of the spring and which carries a valve stem 26 that extends through the openings 17 and 19 and projects from the cap 18. The stem 26 carries a head or collar 27 that is adapted to be engaged by a yoke-shaped end 28 of an actuating lever 29, the lever 29 being pivotally mounted on a pin 30 carried between ears 31 that project from the cap 18.

With the structure thus far described, pressure acting on the valving member through the port 12 will effect unseating thereof under ordinary working conditions when the pressure exceeds the force of the spring 24 and pressure is relieved through the port 7. However, when the valve is operating in connection with corrosive or gummy fluids or when there is a long period between operations of the valving member, the valving member is apt to stick on its seat with the result that pressure builds up under the valve member which may be in excess to the safe working pressure of the vessel to which the valve is connected.

In order to overcome this difficulty, we incorporate into the structure of the valving member a safety head which is frangible under predetermined excessive pressures to relieve pressure directly through the valving member as now to be described.

In accomplishing the invention, the valving member is provided with an axial recess 32 opening through the seating side thereof and which forms a shoulder-like seat 33 encircling a reduced continuation 34 of the recess. The extension 34 connects with the annular passageway 22 through a plurality of radially extending outlet ports 35. Seated on the shoulder 33 is a clamping ring 36 having an inner diameter substantially conforming to that of the recess portion 34 and has a beveled annular face 37 adapted to engage an anchoring flange 38 of a safety head diaphragm 39 that extends across the portion 34 of the bore and closes connection between the inlet port 12 and the radial outlet ports 35. Also received in the recess and having a beveled clamping face 40 for engaging the opposite side of the anchoring flange of the diaphragm is a clamping ring 41 which is urged in clamping position by a retaining ring 42. The retaining ring 42 has external threads 43 which engage internal threads 44 at the opening of the recess. The retaining ring is provided with spanner wrench engaging sockets 45 by which it is adapted to be engaged by a spanner wrench and tightened into position for urging the clamping rings in sealing contact with the diaphragm and form a leak-tight connection therewith. The diaphragm is preferably of concavo-convex type as disclosed in the Raymond Patent No. 1,930,960 issued October 17, 1933. The diaphragm is arranged so that the pressure acts on the concave side. When excessive pressure occurs which will not unseat the valve, the pressure acts to fracture the diaphragm in the manner of the diaphragm disclosed in the Raymond patent, to allow release of pressure through the radial ports 35.

In using the valve constructed and assembled as disclosed and assuming that it is mounted on a vessel in which the pressure may accumulate to the point where the pressure is sufficient to raise the valving member 21 against action of the spring 24 for escape through the port 7. When the pressure is relieved, the spring automatically seats the valving member 21 and it remains seated until the pressure again is sufficient to effect unseating against action of the spring. The valving member may also be unseated upon actuation of the lever 29 if manual operation is required.

When the relief valve is operating under corrosive conditions or the like, the valving member may stick upon the seat so that pressures may rise above operating pressures whereupon the diaphragm splits open and relieves the pressure through the radial ports 35.

From the foregoing it is obvious that we have provided a combination pressure relief and safety head valve which provides a simple and inexpensive structure and wherein the safety head is incorporated in the valving member.

What we claim and desire to secure by Letters Patent is:

A combination pressure relief and safety head valve including a substantially cylindrical valve body having a substantially cylindrical valve chamber, an annular valve seat member in one end of the valve body and forming a port in coaxial relation with the valve chamber and encircled by a valve seat, a cylindrical valving member engageable with the seat and of smaller diameter than the diameter of the valve chamber to provide a free annular passageway for the full length of the valving member in all positions of said valving member, said valving member having an axial recess opening through the seating end and having a reduced extension of said recess forming an annular shoulder, said extension being connected with a lateral port opening through the circumference of the valving member and in direct connection with said annular passageway in all positions of the valving member, a frangible diaphragm, clamping rings engaging respective sides of said diaphragm and in concentric relation with said recess with the clamping ring remote from said valve seat member seated against said shoulder, a retaining ring having threads engaging threads in said recess and engaging the other clamping ring to retain the frangible diaphragm normally closing communication between the ports, said diaphragm being adapted to fracture for relief of pressure through the port in said seat member and through the lateral port into the annular passageway in all positions of the valving member, said valve body having a lateral outlet in direct connection with the annular passageway in all positions of the valving member, a cap closing the end of the valve chamber opposite the valve seat member, a stem connected with the valving member and extending through the cap for effecting manual unseating of the valving member, and a spring having one end bearing on the valving member for normally retaining the valving member on said seat.

MAX J. KUNERT.
ROBT. S. COFFMAN.

REFERENCES CITED

The following references are of record in the file of this patent:

UNITED STATES PATENTS

| Number | Name | Date |
|---|---|---|
| 443,873 | Snow | Dec. 30, 1890 |
| 1,898,899 | Rowley | Feb. 21, 1933 |
| 1,930,960 | Raymond | Oct. 17, 1933 |
| 2,124,374 | Mulloy | July 19, 1938 |
| 2,236,564 | Cornell | Apr. 1, 1941 |